United States Patent Office

2,789,060
Patented Apr. 16, 1957

---

2,789,060

PESTICIDAL COMPOSITION

Willy Spangenberg, Hamburg-Blankenese, and Karl Culemeyer, Hamburg-Langenfelde, Germany, assignors to Willy Spangenberg & Co., Hamburg-Eidelstadt, Germany No Drawing. Application March 8, 1952,
Serial No. 275,676

Claims priority, application Germany July 28, 1951

14 Claims. (Cl. 106—15)

The present invention relates to the art of pesticidal compositions adapted for the control and obviation of insects, fungi and the like.

It is an object of the present invention to provide new and useful pesticidal compositions.

It is a further object of the invention to afford new and useful pesticidal compositions which are particularly useful for the treating of wood and wood products.

It is an additional object of the present invention to attain new and useful pesticidal compositions which when used to coat wood and wood products will protect the wood from fungus, insects and other pests over a long period of time and which are adapted to function as a paint base or primer coat for the wood.

With the above objects in view, the present invention provides for a pesticidal coating composition containing as active ingredients a drying oil derived from a polyfunctional alcohol, other than glycerol, having three or more functional groups, and a fungicide or insecticide uniformly distributed through and embedded in said drying oil.

The term pesticide as used herein is intended to embrace fungicides, insecticides and other pest controlling agents. The reference herein to drying oil or drying oils within the purport of the invention contemplates those drying oil ester products derived from alcohols other than glycerol having three or more functional groups and derivatives thereof. This group of alcohols may be defined as those polyfunctional alcohols with three functional groups having at least two carbon atoms in the chain of at least one of said functional groups, or as having in the molecule at least three functional groups and at least four carbon atoms, and polyfunctional alcohols with at least four functional groups, as well as derivatives thereof.

For the protection of wood and wood products from the harmful influence of small living organisms of all sorts and especially the wood drying and wood destroying fungus, insects, etc., it has been common to press into or impregnate the wood under pressure such fungicides and insecticides as carbolineum solutions, etc. Another method of treating the wood has been to allow solutions of naphthalene and chloronaphthalene or their salts dissolved in aliphatic or aromatic hydrocarbons to seep into the wood.

However, the aforesaid prior art compositions, particularly in their treatment of wood or the like, have manifested definite shortcomings, especially in the fact that it has been difficult and substantially impossible to paint wood which has been treated with such compositions. This is attributable to the impregnating agent or composition preventing the drying of the wood, or subsequent to the drying the impregnating agent working its way through the surface of the paint and thereby adversely affecting the appearance thereof.

A further difficulty with the prior methods of treating wood is that the impregnating agents heretofore utilized have a very strong odor which is in fact harmful to health and therefore prevents the use of such impregnating agents within rooms or the like.

In an attempt to overcome these objections, the use of chlorinated naphthalene dissolved in linseed oil was tried as a base or priming coat before the painting of the wood. However, the results were unsatisfactory because the base still seeped through the paint and cracked the surface thereof, and in addition the fungicide was of objectionable odor. Moreover a primary objection was that the linseed oil served as a nutrient for the small living animal and vegetable organisms. Therefore, the linseed oil obviously lowered the effectiveness of the chlorinated naphthalene.

The use of chlorinated phenols such as pentachlorophenol was then tried as a fungicide and/or insecticide. These substances have as a great advantage the fact that they are odorless. These agents dissolved in the drying oil actually dry the wood and the wood could then in due course be painted. These substances did not crack and seep through the paint. However, one significant fault still remained. This was the fact that the natural drying oils, such as linseed oil, served as a nutrient medium for the pests.

It was discovered pursuant to the present invention that esters of alcohols having three or more functional groups and derivatives thereof, except for glycerol, could serve as drying oils and were indigestible to plant and animal organisms. Only glycerols, of all the three or more valent alcohols, is digestible by these organisms, in such ester form.

The present invention therefore provides for a pesticidal coating composition which utilizes fungicides and/or insecticides, in conjunction with a drying oil of the three or more valent type, excluding glycerol esters. These fungicides and/or insecticides are uniformly distributed throughout and embedded in the drying oil. This may be accomplished in a number of ways. An intimate mixture or suspension may be made of the fungicide and/or insecticide and the drying oil. Such suspension may be used by itself as the pesticidal coating composition, or the coating composition may be prepared with the use of a solvent. In either event the fungicide and/or insecticide is thoroughly embedded or distributed throughout the drying oil.

A pesticidal coating composition may be prepared by incorporating a drying oil and a pesticide in a solvent. The solvent may act as such for either the drying oil or pesticide, the undissolved constituent being distributed or suspended in the solvent. Conversely the solvent may function as both a solvent for the drying oil and for the pesticide. For example a solution may be prepared for use as a pesticidal composition comprising the hexanetriol ester of linoleic acid as drying oil and pentachlorophenol as insecticide, both dissolved in benzene. Useful solvents for this type of pesticidal composition include all the common solvents applicable to paints and varnishes as used in the paint and varnish industry, i. e. benzene, turpentine, alcohols of all types, etc.

Of particular interest with the present invention are those insecticides and/or fungicides which comprise chloro-substitution products of the phenols, the said products being otherwise referred to as chlorinated phenols. Illustrative compounds within the purview of the invention are monochlorophenol, trichlorophenol, pentachlorophenol, substitution products thereof, chlorinated cresol, chlorinated xylol and chlorinated thymols, such as parachlorometacresol, pentachloroxylenol, trichlorothymol, etc.

As examples of the drying oils which may be used according to the present invention are those made up of esters of butanetriol, hexanetriol, erythritol, pentaerythritol, mannitol, sorbitol, inositol, etc, preferably esterified with higher unsaturated fatty acids such as oleic acid, linoleic acid, talloleic fatty acids, etc. It will be noted that all of the aforesaid illustratively designated alcohols have in their respective molecules at least three functional hydroxy groups and at least four carbon atoms. Similarly the group of alcohols exemplified by erythritol, pentaerythritol, mannitol, sorbitol, and inositol may be defined as in the category of alcohols having at least four functional hydroxy groups.

The following examples are merely illustrative of the present invention, the scope of said invention not however, being limited thereto.

Example I

A drying oil is prepared of an ester consisting of 100 parts by weight of talloleic fatty acid, which essentially comprises a mixture of substantially equal parts of linoleic and oleic acid, with 12 parts by weight of pentaerythritol. 35 parts by weight of this ester is dissolved in 65 parts by weight of benzene. 5 parts by weight of pentachlorophenol is added to this solution and dissolved therein.

This solution is used to treat the wood in any normal manner such as by spraying, painting, etc. It serves as an excellent base or primer for paints and protects the wood against all types of plant and animal organisms. After a few hours, thus treated wood may be painted without encountering difficulties or objections of the above-indicated type, and is adapted for diversified use as desired.

Example II

An ester is prepared from 100 parts linseed oil fatty acids and 16 to 17 parts by weight of hexanetriol, said acids comprising in essence a mixture of linolenic acid, linoleic acid and oleic acid. The thus prepared drying oil is dissolved in benezene so as to make a 40% solution. To this solution is added pentachlorophenol, about 5%.

The solution prepared in this manner is excellent for the treatment of wood for protecting the same from insects and/or fungus. Wood treated with such drying oils-fungicide solution as a priming coat may after a few hours be painted, the objections applicable to compositions of the type previously utilized being substantially obviated.

While the invention herein has been illustratively described in accordance with desirable and preferred embodiments thereof, it will be apparent that variations and deviations in its details and features, particularly with respect to the compositions designated, may be made without departing from the essence or scope of the invention as disclosed herein and defined in the following claims.

Having thus set forth our invention, we claim:

1. A pesticidal coating composition adapted for the treatment of wood and as a priming coat therefor consisting essentially of a major proportion of at least one drying oil which is an ester of a higher unsaturated fatty acid and a polyfunctional alcohol, the latter having at least three functional groups and at least four carbon atoms, said ester having distributed therethrough a a minor proportion of at least one pesticide.

2. A pesticidal coating composition adapted for the treatment of wood and as a priming coat therefor consisting essentially of a major proportion of at least one drying oil which is an ester of a higher unsaturated fatty acid and a polyfunctional alcohol with at least three functional groups and having at least four carbon atoms, and a minor proportion of at least one pesticide, the ingredients determining the said composition being in a solvent of the class applicable to paints and varnishes in which at least one of the aforesaid ingredients of the composition is dissolved, with any undissolved ingredient being distributed in the solvent.

3. A pesticidal coating composition adapted for the treatment of wood and as a priming coat therefor consisting essentially of a major proportion of at least one drying oil which is an ester of a higher unsaturated fatty acid and a polyfunctional alcohol with at least three functional groups and having at least four carbon atoms, said ester having uniformly distributed therethrough and embedded therein a minor proportion of at least one pesticide from the group consisting of chlorinated phenols, chlorinated cresols, chlorinated xylols, and chlorinated thymols.

4. A pesticidal coating composition adapted for the treatment of wood and as a priming coat therefor consisting essentially of a major proportion of at least one drying oil which is an ester of a higher unsaturated fatty acid and a polyfunctional alcohol, the latter having at least three functional groups and at least four carbon atoms, and a minor proportion of at least one pesticide from the group consisting of chlorinated phenols, chlorinated cresols, chlorinated xylols, and chlorinated thymols, the ingredients determining the said composition being in a solvent of the class applicable to paints and varnishes in which solvent at least one of the aforesaid ingredients is dissolved, with any undissolved ingredient being distributed in the solvent.

5. A pesticidal coating composition adapted for the treatment of wood and for applying a priming coat thereto as a preliminary to the painting thereof, consisting essentially of a major proportion of at least one drying oil which is an ester of a higher unsaturated fatty acid and a polyhydric alcohol selected from the group consisting of butanetriol, hexanetriol, erythritol, pentaerythritol, mannitol, sorbitol and inositol, said ester being admixed with a minor proportion of a pesticide from the group consisting of chlorinated phenols, chlorinated cresols, chlorinated xylols and chlorinated thymols.

6. A pesticidal coating composition adapted for the treatment of wood and for applying a priming coat thereto as a preliminary to the painting thereof, consisting essentially of a major proportion of at least one drying oil which is an ester of a higher unsaturated fatty acid from the group consisting of oleic acid, linoleic acid, linseed oil fatty acids, and talloleic acid with an alcohol from the group consisting of polyfunctional alcohols with at least three functional groups and having at least four carbon atoms, said ester having uniformly distributed therethrough and embedded therein a minor proportion of at least one pesticide from the group consisting of chlorinated phenols, chlorinated cresols, chlorinated xylols, and chlorinated thymols.

7. A pesticidal coating composition as in claim 5, wherein the higher unsaturated fatty acid is selected from the group consisting of oleic acid, linoleic acid, linseed oil fatty acids, and talloleic acid.

8. A pesticidal coating composition as in claim 6, wherein the ingredients determining the composition are in a solvent of the class applicable to paints and varnishes in which solvent at least one of the ingredients is dissolved, with any undissolved ingredient being distributed in the solvent.

9. A compostion as in claim 8, wherein the solvent is from the group consisting of benzene, turpentine, and alcohols.

10. A pesticidal coating composition as in claim 7, wherein the ingredients determining the composition are in a solvent from the group consisting of benzene, turpentine, and alcohols, with any undissolved ingredient being distributed in the solvent.

11. A pesticidal coating composition adapted for the treatment of wood and as a priming coat therefor consisting essentially of a major proportion of a drying oil which is an ester of at least one higher unsaturated fatty acid and pentaerythritol, the said drying oil having in minor proportion pentachlorophenol uniformly distributed therethrough.

12. A pesticidal coating composition adapted for the treatment of wood and as a priming coat therefor consisting essentially of a major proportion of a drying oil which is the hexane-triol ester of linoleic acid, and a minor proportion of pentachlorophenol, the said composition being dissolved in benzene.

13. A pesticidal coating composition adapted for the treatment of wood and as a priming coat therefor consisting essentially of a major proportion of a drying oil which is an ester of talloleic fatty acid with pentaerythritol, and a minor proportion of pentachlorophenol, the said composition being dissolved in benzene, the pentachlorophenol content of the solution comprising approximately 5%.

14. A pesticidal coating composition adapted for the treatment of wood and as a priming coat therefor consisting essentially of a major proportion of a drying oil which is an ester of linseed oil fatty acids and hexanetriol, and a minor proportion of pentachlorophenol, the said composition being dissolved in benzene, the pentachlorophenol content of the solution comprising approximately 5%.

References Cited in the file of this patent
UNITED STATES PATENTS

| | | |
|---|---|---|
| 2,153,841 | Mills | Apr. 11, 1939 |
| 2,182,081 | Hatfield | Dec. 5, 1939 |
| 2,406,795 | Bernardi et al. | Sept. 3, 1946 |
| 2,464,202 | Rust | Mar. 15, 1949 |
| 2,540,239 | Bowden et al. | Feb. 6, 1951 |
| 2,584,300 | Simmers | Feb. 5, 1952 |

OTHER REFERENCES

Industrial and Engineering Chemistry (Burrell), vol. 37, pp. 86–89 (January 1945).

Industrial and Engineering Chemistry (Carswell et al.), vol. 31, pp. 1431–1435 (November 1939).

U. S. DEPARTMENT OF COMMERCE
PATENT OFFICE
CERTIFICATE OF CORRECTION

Patent No. 2,789,060                                          April 16, 1957

Willy Spangenberg et al.

It is hereby certified that error appears in the printed specification of the above numbered patent requiring correction and that the said Letters Patent should read as corrected below.

Column 1, line 41, after "alcohols" insert a comma; line 42, after "glycerol" insert a comma; line 52, for "drying" read -- dyeing --; line 54, after "pressure" insert -- with --; column 2, line 29, for "glycerols" read -- glycerol --; line 59, after "with" insert -- respect to --; column 3, line 36, for "benezene" read -- benzene --; column 5, line 1, for "hexane-triol" read -- hexanetriol --.

Signed and sealed this 15th day of April 1958.

(SEAL)
Attest:

KARL H. AXLINE
Attesting Officer

ROBERT C. WATSON
                                                                                                            Commissioner of Patents